United States Patent [19]
Emerson et al.

[11] Patent Number: 5,574,864
[45] Date of Patent: Nov. 12, 1996

[54] METHOD OF IMPLEMENTING EISA BUS DEVICES ON A HOST BUS BY DISABLING BRIDGE CIRCUITRY BETWEEN HOST AND EISA BUSES

[75] Inventors: Theodore F. Emerson; Timothy S. Wettach, both of Houston, Tex.

[73] Assignee: Compaq Computer Corporation, Houston, Tex.

[21] Appl. No.: 303,405

[22] Filed: Sep. 9, 1994

[51] Int. Cl.⁶ .................................................. G06F 13/00
[52] U.S. Cl. ......................................... 395/280; 395/308
[58] Field of Search ..................................... 395/280, 308

[56] References Cited

U.S. PATENT DOCUMENTS

| | | | |
|---|---|---|---|
| 5,179,713 | 1/1993 | Catlin et al. | 395/800 |
| 5,317,721 | 5/1994 | Robinson | 395/500 |
| 5,333,293 | 7/1994 | Bonella | 395/425 |
| 5,341,494 | 8/1994 | Thayer et al. | 395/425 |
| 5,396,602 | 3/1995 | Amini et al. | 395/325 |
| 5,426,739 | 6/1995 | Lin et al. | 395/325 |

OTHER PUBLICATIONS

82358DT EISA Bus Controller Data Sheet Oct. 1991, Intel Peripheral Components Data Book (1992), pp. 1–306 to 1–381.

Primary Examiner—Jack B. Harvey
Assistant Examiner—Sumati Lefkowitz
Attorney, Agent, or Firm—Pravel, Hewitt, Kimball & Krieger

[57] ABSTRACT

In a computer system with a host bus and an EISA bus, devices typically implemented on an EISA bus are instead implemented on a host bus. These devices are still accessed with EISA commands, however, and an EISA bus controller bridge between the host bus and EISA bus is disabled on such accesses by being made to think that the actual command being executed on the host bus is a local memory command. This permits the EISA device to respond to EISA I/O and memory operations directed at addresses that it would normally respond to when connected to the EISA bus.

6 Claims, 2 Drawing Sheets

METHOD OF IMPLEMENTING EISA BUS DEVICES ON A HOST BUS BY DISABLING BRIDGE CIRCUITRY BETWEEN HOST AND EISA BUSES

BACKGROUND OF THE INVENTION

1. Field of the Invention

The invention relates to computer busing techniques, and more specifically to implementation on a host bus of devices intended for a standard peripheral bus.

2. Description of the Related Art

With the surge in development of network based microcomputer systems, network servers have been called upon to process and transfer ever greater amounts of data. This data movement has historically relied upon SCSI controllers accessing disk arrays, as well as network interface controllers for accessing networks.

These controllers have typically been placed on an EISA bus accessed by the microprocessor through an EISA bus controller. As speeds have increased, however, and as greater demands have been placed on the data throughput of these servers, it has become more and more desirable to move these SCSI controllers and network interface controllers directly to the host bus of a microcomputer system. A host bus typically has more bandwidth and allows for more direct data transfers between a microprocessor and these communications devices, as well as permitting direct data transfer between local memory and these devices.

But a great deal of system software has been written to access SCSI and network interface controllers as being present on an EISA bus. This system software relies on these devices being logically present on the EISA bus, with memory mapped and input/output (I/O) registers appearing in the EISA address space and being accessed using commands directed to that address space. Further, many of the host bus devices, such as memory controllers and EISA bus controllers, assume that either the memory controller or the EISA bus controller will execute the cycle provided by the processor. No provisions are made for local devices. It would therefore be greatly desirable to allow implementation of various EISA devices on a host bus without necessitating changes to system software to access those devices or major modification to existing memory or EISA bus controllers.

SUMMARY OF THE INVENTION

In a computer system implemented according to the invention, an EISA device is implemented on a host bus of a microcomputer system. The EISA device still responds to I/O and memory operations as though it were on the EISA bus. That is, the microprocessor accesses these devices using EISA I/O and memory commands and running exactly the same EISA driver software as would be used if these devices were physically on the EISA bus.

To achieve this, a computer according to the invention provides an EISA device on the host bus with decode circuitry for decoding accesses directed to that device. When an access to this EISA device on the host bus is detected, the EISA bus controller bridge between the host bus and the EISA bus is disabled by being made to think that the current bus operation is a memory operation local to the host bus, an operation to which the EISA bus controller should not respond. At the same time, local memory controller logic remains disabled because that logic considers the cycle to be to a non-local device, such as one on the EISA bus. This permits the EISA device to respond to the EISA I/O or memory command without interference from the EISA bus controller or memory controller, yet does not require that those devices be redesigned.

In this way, EISA bus devices can be implemented on the host bus without necessitating rewriting of system software or redesigning the memory or EISA bus controller.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
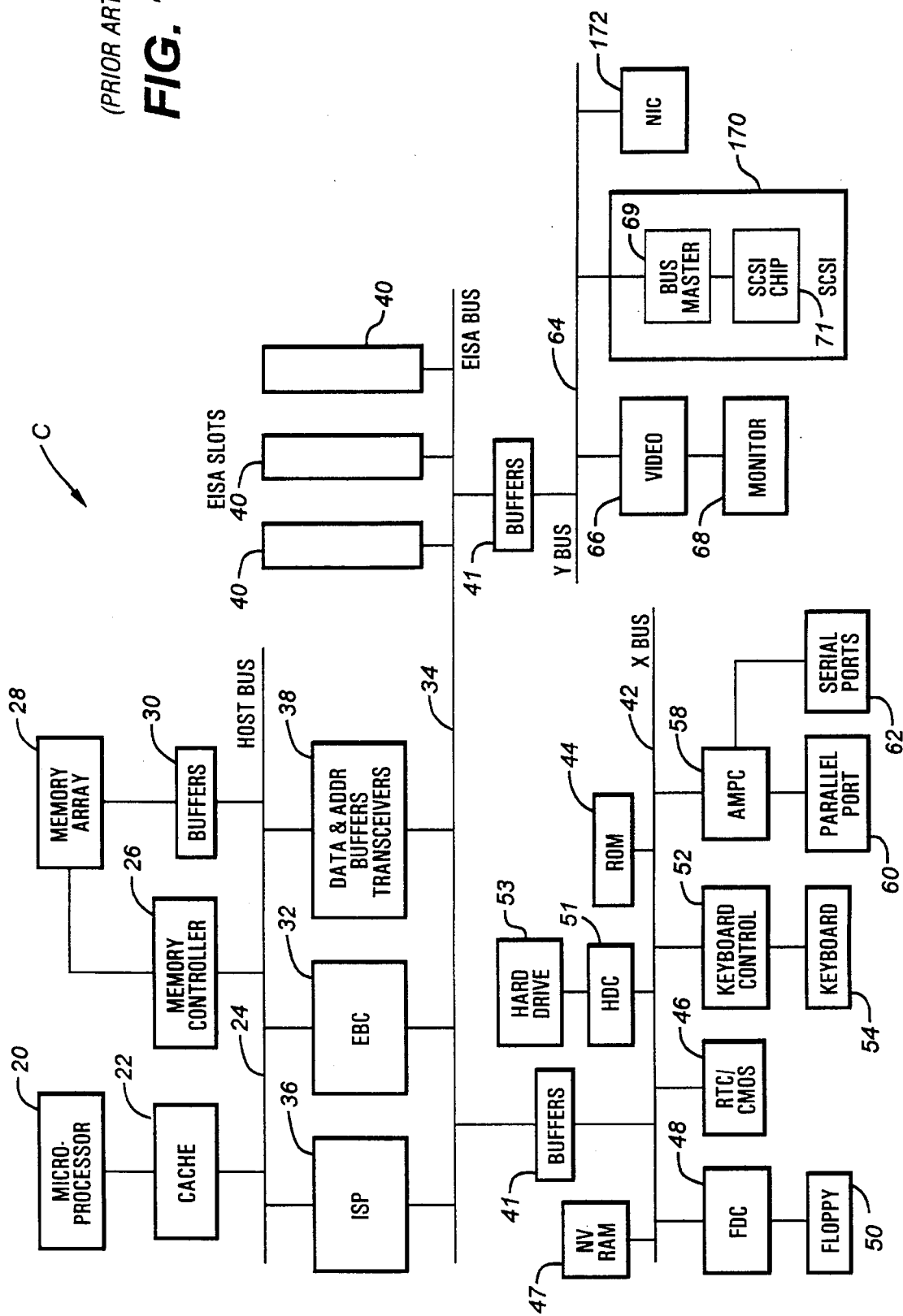
FIG. 1 is a block diagram illustrating a prior art computer system in which SCSI and network interface controllers are implemented as extensions of the EISA bus, rather than on the host bus.

Referring to FIG. 1, a prior art computer system C having a microprocessor 20, preferably an 80486 or a Pentium® from Intel Corporation, is connected to a cache controller 22. The cache controller 22 in turn is connected to a host bus 24 which includes address, data, and control portions. The host bus 24 is very similar to the processor local bus, but often includes additional signals and has greater loading capabilities. A memory controller 26 is connected to the host bus 24 to receive and control host bus local memory operations. The memory controller 26 is connected to a local memory array 28 of the computer C, with the data from the local memory array 28 going through a data buffer 30 to the host bus 24. The memory controller 26 is preferably similar to that disclosed in U.S. Pat. No. 5,333,293.

Also connected to the host bus 24 is an EISA bus controller (EBC) 32 which handles translation of signals between the host bus 24 and an EISA bus 34. The EBC 32 is preferably similar to the 82358 provided by Intel. The EBC 32 is connected to an integrated system peripheral (ISP) 36 which includes a DMA controller, timers, interrupt controller, EISA bus arbiter, and other devices as necessary and common in an EISA system. The ISP 36 is preferably similar to the 82357 provided by Intel. The ISP 36 is connected to the host bus 24 and the EISA bus 34. In addition, the EBC 32 is connected to a series of address and data latches and transceivers 38 which are connected to the host bus 24 and EISA bus 34 and provide the necessary address and data latching and buffering to allow development of an EISA system. Also connected to the EISA bus 34 are a series of EISA slots 40 that receive interchangeable circuit boards.

Two additional buses are developed from the EISA bus 34. Each additional bus is connected through a set of buffers 41 to the EISA bus 34. The first of these is referred to as an X bus 42, which is conventionally a 16-bit bus used to connect with the majority of support chips present on the system board of the computer system C. For example, these support chips include a read only memory (ROM) 44; a real time clock (RTC) and CMOS memory 46; non-volatile memory 47; a floppy disk controller 48, which in turn is connected to a floppy disk drive 50; a hard disk controller 51 and hard disk drive 53; an 8042 keyboard controller 52, which is in turn connected to a keyboard 54 and a pointing device (not shown); and a multiple peripheral controller (AMPC) 58 which provides a parallel port 60 and a series of serial ports 62.

A second bus developed from the EISA bus 34 is a Y bus 64, which is preferably a 32-bit bus to allow high data rate transfers to the EISA bus 34. A video controller 66 and its associated monitor 68 are connected to the Y bus 64. A small computer system interface (SCSI) subsystem 170 is also present on the Y bus 64, and includes a bus master interface 69, a SCSI controller 71 and a SCSI port (not shown) which is used to connect to SCSI devices. A network interface controller (NIC) 172 for interfacing with a standard computer network is also connected to the Y bus 64.

Logically, the microprocessor 20 accesses devices on the X bus 42 and the Y bus 64 by executing EISA bus 34 commands. That is, although the devices on the X bus 42 and the Y bus 64 are physically buffered, this buffering is logically transparent to the microprocessor 20. The SCSI subsystem 170 and the NIC 172 would be controlled by the microprocessor 20 using the same memory and input/output (I/O) operations whether those devices were present on the Y bus 64 or, instead, were directly connected to the EISA bus 34.

This logical equivalency flows from the fact that the buffers 41 are provided principally to handle the additional load requirements of these various system devices. Therefore, the X bus 42 and the Y bus 64 are simply physical extensions of the EISA bus 34. Devices on the X bus 42 and the Y bus 64 could be moved directly onto the EISA bus 34, but at the expense of additional loading on the EISA bus 34, reducing the number of EISA slots 40 that could be supported by the computer system C.

Figure 2:
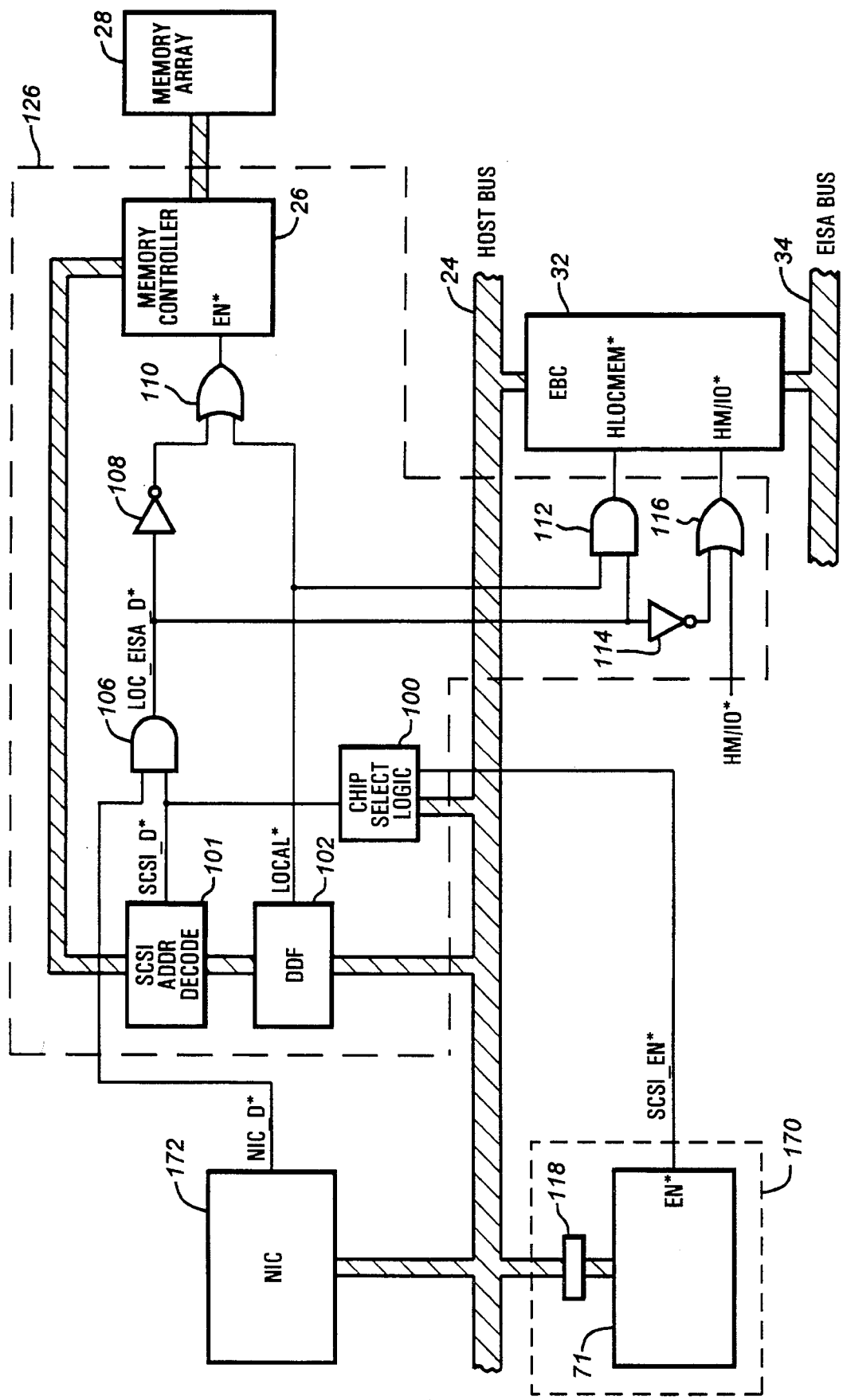
FIG. 2 is a block diagram/schematic illustration of the host bus implementation of EISA devices according to the invention.

Turning to FIG. 2, details of a computer system implementing the device and method according to the invention are shown. As can be seen in FIG. 2, a SCSI subsystem 170 and a NIC 172 have been moved to the host bus 24. A number of factors make this desirable. As network communication rates and as SCSI data rates have increased, these devices have begun to encroach on the data bandwidth of the prior art computer system C. This is especially true in network servers, which may have multiple NICs as well as multiple SCSI subsystems. Because of the large amounts of data flowing to and from these devices, it has thus become desirable to place the devices on the host bus 24, which has a greater data bandwidth than the EISA bus 34.

This move presents a problem, however. A great deal of system controlling software, including device drivers and power-on self-test software, has been written expecting the SCSI subsystem and NIC to be EISA devices. For example, during system startup, system configuration software typically reads I/O addresses 0zC80 hex to 0zC83 hex for z equal to 1 to 0F hex. These four bytes return an EISA board's unique identification code, with "z" being incremented to examine each EISA slot. By determining what board is in which slot, the EISA configuration software then installs in appropriate EISA device driver directed to that slot's EISA addresses.

This system software includes embedded commands for accessing these devices as EISA devices, and it would be an extensive task to rewrite all of this software to address these devices as host bus 24 devices rather than EISA bus 34 devices. Further, the memory controller 26 and EBC 32 do not anticipate other devices being on the host bus 24 and so assume one or the other is executing the cycle.

In a system according to the invention, however, this problem is alleviated by hardware that "tricks" the system into thinking that the NIC 172 and the SCSI subsystem 170 are EISA bus 34 devices, when they are in fact attached to the host bus 24. Specifically, standard EISA based memory and I/O commands previously used to access the SCSI subsystem 170 and the NIC 172 in the prior art computer system C of FIG. 1 still perform the desired functions, even though these devices are now coupled to the host bus 24. Further, the hardware "tricks" the memory controller 26 into thinking that a non-local or external cycle is executing while also "tricking" the EBC 32 into thinking a local memory cycle is executing. Thus, neither the memory controller 26 nor the EBC 32 respond, allowing either the NIC 172 or SCSI subsystem 170 to respond without conflict.

Referring to FIG. 2, the memory controller 26 and the EBC 32 are still present on the host bus 24, along with the newly added NIC 172 and SCSI subsystem 170. Chip select logic circuitry 100 has also been added, preferably in the form of a part of an application specific integrated circuit (ASIC) 126. In the preferred embodiment, the memory controller 26 is included in the single ASIC 126 along with certain previously separate blocks, such as a data destination facility (DDF) 102 as described in U.S. Pat. No. 5,333,293. The ASIC 126 also includes logic for SCSI address decode 101. Certain connections have been omitted for clarity, such as connections between the local memory array 28 and the host bus 24. It is understood that the combination of these various functions into the ASIC 126 was done for cost reasons, but that the various functions could have remained separated, with the chip select logic 100 and the SCSI address decode logic 101 being performed in other conventional manners, such as through the use of PALs.

In the computer system according to the invention shown in FIG. 2, the SCSI address decode logic 101 is coupled to the host bus 24 through logic in the ASIC 126. It provides a SCSI EISA memory or I/O address decode signal SCSI_D* as true, or active low, when a memory or I/O command on the host bus 24 corresponds to an EISA SCSI address range used to access the SCSI subsystem 170 in the prior art computer system C. This address range is preferably set by writing to setup registers in the SCSI address decode logic 101 using port decode logic not shown. Throughout this description, a signal followed by an "*" is active when low; the inverse logical signal is referred to by dropping the "*".

In the disclosed embodiment of a computer system according to the invention, the NIC 172 internally decodes its addresses, performing functions equivalent to the SCSI address decode logic 101. When it detects an access to its particular EISA addresses, either memory or I/O, it asserts an address decode signal NIC_D* low, or true.

The DDF 102 in the ASIC 126 is also coupled to the host bus 24. As is known in the art, the DDF 102 is programmed on system startup to map memory locations as being local to the host bus 24 in the local memory array 28 or instead being present on the EISA bus 34. The DDF 102 also maps other attributes, such as page cacheability, which are not important here. On detecting the presence of a memory command on the host bus 24, the DDF 102 examines the address and determines whether that particular address is mapped to the local memory array 28 or instead to memory on the EISA bus 34. Certain EISA devices are memory mapped, including the SCSI subsystem 170 of the prior art computer system C, and thus the DDF 102 is preferably further programmed to map accesses to those memory addresses to the EISA bus 34. Again, given the goal of implementing EISA devices on the host bus 24 with as few programming changes as possible, the DDF 102 can be programmed as though the SCSI subsystem 170 and the NIC 172 are still on the EISA bus 34.

The DDF 102 asserts a local memory signal LOCAL* true, or active low, if an address is mapped to the host bus 24 local memory array 28. If the memory address instead accesses memory or a memory mapped device on the EISA bus 34, the DDF 102 deasserts LOCAL*, or drives it high. In the prior art computer system C, LOCAL* would have been directly connected to the memory controller 26, enabling that memory controller 26 when LOCAL* was true. Similarly, this signal would have been directly routed to an HLOCMEM* input of the EBC 32. As is known to the art, the EBC 32 includes such an input that, when asserted low, prevents the EBC 32 from responding to memory operations. When the HLOCMEM* input of the EBC 32 is instead driven high, or false, the EBC 32 responds, controlling appropriate signals on the host bus 24.

SCSI_D* and NIC_D* are provided as inputs to an AND gate 106. As an output, the AND gate 106 then provides a local EISA address decode signal LOC_EISA_D*, which when true, or low, indicates that one of the EISA devices (i.e., the NIC 172 or the SCSI subsystem 170) on the host bus 24 has been accessed via a memory or I/O command to their respective addresses. LOC_EISA_D* is then inverted by an inverter 108, and LOC_EISA_D is provided as one input to an OR gate 110. The other input to the OR gate 110 is LOCAL*. The output of the OR gate 110 is provided to an enable input in the memory controller 26 which previously received the LOCAL* signal.

LOC_EISA_D* is also provided as an input to an AND gate 112. The other input to the AND gate 112 is provided by LOCAL*, and the output of the AND gate 112 is provided to the HLOCMEM* input of the EBC 32.

LOC_EISA_D*, after being inverted by a second inverter 114, is further provided as an input to an OR gate 116. The second input to the OR gate 116 is provided by a standard host bus 24 signal HM/IO*, which indicates whether the current operation is a memory instruction or an I/O instruction. The output of the OR gate 116 is provided to an HM/IO* input of the EBC 32, again a standard input on EISA bus controllers.

The gates 112, 114, and 116 are preferably implemented as part of the ASIC 126. They could instead, however, be implemented using PALs or discrete logic.

SCSI_D* is also provided to the chip select logic 100. The chip select logic 100 is coupled to various control lines on the host bus 24, and appropriately provides a SCSI enable signal SCSI_EN* during appropriate periods of a memory or I/O cycle executed on the host bus 24. The chip select logic 100 is used to latch, delay, and otherwise conform SCSI_D* to the timing of the host bus 24, thus enabling the SCSI subsystem 170 to respond to operations directed to its EISA addresses. SCSI_EN* is provided to an enable input of the SCSI chip 71 in the SCSI subsystem 170. The SCSI subsystem 170 is further buffered to the host bus 24 via bus mastering and slave logic 118, which logic is similar to the bus mastering logic 69 of the prior art SCSI subsystem 170, but is modified to work with the host bus 24 rather than the EISA bus 34.

The SCSI chip 71 is preferably a 53C710 by NCR; the NIC 172 is preferably an Analog Micro Devices Hilance Am79C965 Ethernet Controller. The additional enable, bus mastering, and glue logic is needed by the SCSI chip 71 in this embodiment because the chip used was not originally intended to be used in Intel microprocessor based systems.

In operation, assume that the microprocessor 20, not shown in FIG. 2, executes an I/O operation that is generally directed to the SCSI subsystem 170 when that SCSI subsystem 170 is on the Y bus 64 extension of the EISA bus 34 as shown in FIG. 1. The DDF 102 decodes this I/O address as being a non-local address and deasserts LOCAL*, because the SCSI subsystem 170 would generally be connected to the EISA bus 34. In the prior art systems, this would be directly input to the HLOCMEM* input of the EBC 32, causing the EBC 32 to control the bus in response to the non-local I/O operation. The memory controller 26 would not have responded because the operation was on I/O operation.

Because the SCSI address decode 101, by monitoring the control and address lines on the host bus 24, has determined that this is a SCSI EISA address access, it asserts SCSI_D* true, or low. This forces LOC_EISA_D* true, or low, and similarly forces the output of the AND gate 112 low even though LOCAL* is high, and forces the output of the OR gate 116 high even though HM/IO* is low. This forces the HLOCMEM* input to the EBC 32 low and the HM/IO* input high, fooling the EBC 32 into thinking that the operation is a local memory access. The EBC 32 thus does not respond. Again, the memory controller 26 does not respond because the operation is an I/O operation.

Because SCSI_D* is true, or low, the chip select logic 100 at an appropriate time asserts SCSI_EN*, enabling the SCSI subsystem 170 and permitting the SCSI subsystem 170 to respond to the EISA I/O command placed on the host bus 24 by the microprocessor 20.

Memory mapped operations to the SCSI subsystem 170 would occur slightly differently. In the prior art computer system C, if the processor 20 addresses a memory operation to the SCSI subsystem 170, the DDF 102 indicates the operation is an EISA bus operation by driving LOCAL* false, or high. Thus, the memory controller 26 does not respond, as the cycle is designated external. The EBC 32 does execute the cycle, as HLOCMEM* is negated, or high. In the present embodiment, the DDF 102 still provides the LOCAL* signal as false, or high, so that the memory controller does not respond. However, the SCSI address decode logic 101 asserts SCSI_D* true, or low, so that LOC_EISA_D* is also asserted low. This both further ensures that the memory controller 26 does not respond, even if LOCAL* is programmed improperly in the DDF 102, and forces the EBC 32 to receive HLOCMEM* asserted low and HM/IO* asserted high, to indicate a local memory cycle, so that the EBC 32 does not respond. Thus, neither the memory controller 26 nor the EBC 32 respond in this case.

The SCSI chip 71 includes a number of internal registers. These registers are used to control the SCSI chip 71, and extensive driver changes would generally be needed if these registers were to change position or to otherwise be accessed through some different means other than EISA I/O addresses. In the disclosed embodiment, the C710 resources of the SCSI chip 71 are implemented as follows:

| System Address map for C710 Resources (CPU's Perspective) | | | |
| --- | --- | --- | --- |
| M/O | Address | R/W | Function |
| I/O | z000–z07F | R/W | C710 Registers |
| I/O | zC80–zC83 | R | EISA ID |
| I/O | zC88 | R/W | SCSI Interrupt Select |
| I/O | zC89 | R | SCSI Cable Sense |

The NIC 172 would have similar EISA I/O and memory addresses.

The EISA address prefix, or "slot," is selected by writing to an appropriate control register in the ASIC 126 of FIG. 2. By writing 4 bits to a particular control register, preferably located at 0C50h, the "z" prefix of the table above is set to an appropriate EISA "slot".

As will be appreciated from the foregoing disclosure, the ASIC 126, in conjunction with the additional logic, "tricks" the EBC 32 into believing that I/O and memory operations directed at the NIC 172 or the SCSI subsystem 170 on the host bus 24 are actually local memory operations. For this reason, the EBC 32 does not respond, permitting the NIC 172 or the SCSI subsystem 170 to provide appropriate responses on the host bus 24 without bus contention with the EBC 32. Although this is shown to be implemented by forcing the HLOCMEM* input of the EBC 32 low and the HM/IO* input high, some EISA bus controllers include a local I/O HLOCIO* input, which could further be used in conjunction with HLOCMEM*, with no modifications then needed to the signal driving the HM/IO* input of the EBC 32. While no changes necessarily need to be made to keep the memory controller 26 from responding, as LOCAL* is preferably driven as before, the logic ensures that the memory controller 26 does not respond, thus "tricking" it in case LOCAL* is improperly set.

The NIC 172 operates similarly to the SCSI subsystem 170, except that the NIC 172 includes its address decode circuitry internally. With both the NIC 172 and the SCSI subsystem 170, memory operations to the address space of the NIC 172 or the SCSI subsystem 170 provide a response similar to I/O operations, in that the EBC 32 is disabled by the assertion of HLOCMEM*.

Further, it will be readily apparent that other devices intended for a bus other than a host bus can be implemented on the host bus without requiring extensive software modifications. By locally decoding the address of these devices, and then disabling the bridge between the host bus 24 and the EISA bus 34, such devices can function on the host bus 24 as though there were in fact present in the EISA bus 34.

In all of these cases, although the EBC 32 is tricked into believing that this is a local memory operation, the memory controller 26 remains disabled. Thus, the NIC 172 and the SCSI subsystem 170, or other EISA devices implemented on the host bus 24, are permitted to respond to EISA I/O and memory addresses that would normally be directed to the EISA bus 34.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system in which non-host bus devices are implemented on a host bus, comprising:

a host bus;

a microprocessor coupled to said host bus that executes memory operations and input/output operations on said host bus;

a standard peripheral bus that includes an address space;

bridge circuitry for communicating between said host bus and said standard peripheral bus, said bridge circuitry receiving a host bus memory access signal and a memory-input/output operation signal, wherein said bridge circuitry responds to an operation on said host bus by passing the operation to said standard peripheral bus when the operation is accompanied by the received memory-input/output operation signal indicating an input/output operation, but wherein said bridge circuitry is non-responsive to an operation on said host bus when the operation is accompanied by the received host bus memory access signal indicating a host bus memory access and the received memory-input/output operation signal indicating a memory operation;

a device connected to said host bus, said device responsive to memory or input/output operations executed by said microprocessor directed to a predetermined portion of the address space of said standard peripheral bus; and means for disabling said bridge circuitry and enabling said device in response to memory or input/output operations directed to said predetermined portion of the address space, said means for disabling providing the memory-input/output operation signal and the host bus memory access signal to said bridge circuitry indicative of a memory operation and indicative of a host bus memory access, whereby said bridge circuitry is non-responsive on said host bus to memory or input/output operations on said host bus directed to said predetermined portion of the address space.

2. The computer system of claim 1, wherein said standard peripheral bus is an EISA bus.

3. The computer system of claim 2, wherein said predetermined portion of the address space includes input/output addresses 0zC80 hex to 0zC83 hex, where z equals 1 to 0F hex.

4. The computer system of claim 1, wherein said device connected to said host bus is a SCSI subsystem.

5. The computer system of claim 1, wherein said device connected to said host bus is a network interface controller.

6. A method of implementing a non-host bus device on a host bus in a computer system with a microprocessor coupled to a host bus that executes memory operations and input/output operations on said host bus, a standard peripheral bus with an address space, and bridge circuitry linking the host bus to the standard peripheral bus, said bridge circuitry receiving a host bus memory access signal and a memory-input/output operation signal, wherein said bridge circuitry responds to an operation on said host bus by passing the operation to said standard peripheral bus when the operation is accompanied by the received memory-input/output operation signal indicating an input/output operation, but wherein said bridge circuitry is non-responsive to an operation on said host bus when the operation is accompanied by the received host bus memory access signal indicating a host bus memory access and the received memory-input/output operation signal indicating a memory operation, said method comprising the steps of:

executing a memory or input/output operation directed to a predetermined portion of the address space of the standard peripheral bus to which the non-host bus device is responsive;

determining that an operation on the host bus is a memory or input/output operation directed to the predetermined portion of the address space;

disabling said bridge circuitry responsive to said determining step by providing the memory-input/output operation signal and the host bus memory access signal to said bridge circuitry indicative of a memory operation and indicative of a host bus memory access, whereby said bridge circuitry is non-responsive on the host bus to memory or input/output operations on the host bus directed to the predetermined portion of the address space; and enabling the device responsive to said determining step.

* * * * *